United States Patent [19]

Tajima et al.

[11] 4,407,462

[45] Oct. 4, 1983

[54] WEB DRIVE APPARATUS

[75] Inventors: Fujio Tajima, Shimoinayoshi; Atsushi Ichikawa, Tsuchiura; Isao Shimizu, Shimoinayoshi, all of Japan

[73] Assignee: Hitachi, Ltd., Tokyo, Japan

[21] Appl. No.: 290,143

[22] Filed: Aug. 5, 1981

[30] Foreign Application Priority Data

Aug. 15, 1980 [JP] Japan ............................. 55/111699

[51] Int. Cl.³ ...................... G11B 15/06; G11B 23/12; B65H 23/20
[52] U.S. Cl. ................................. 242/184; 242/75.47
[58] Field of Search ................... 242/75.47, 75.3, 184, 242/186, 189, 190; 360/73, 71; 318/6, 7; 226/3, 7, 97

[56] References Cited

U.S. PATENT DOCUMENTS 3,842,326 10/1974 Stocker .................................... 318/7
4,030,131 6/1977 Beiter et al. ........................... 360/71
4,172,231 10/1979 deCostemore d'Arc et al. ...... 318/7
4,320,879 3/1982 Saitou et al. ......................... 242/189

Primary Examiner—Leonard D. Christian
Attorney, Agent, or Firm—Antonelli, Terry & Wands

[57] ABSTRACT

In a web drive apparatus in which information is written into or read out of a web intermittently movable between a web supply reel and a web take-up reel by means of an information exchange station, a web tension control signal to be applied to a motor for the web take-up reel is compensated so as to suppress vibrations of the web which may be caused during the intermittent movement of the web.

10 Claims, 4 Drawing Figures

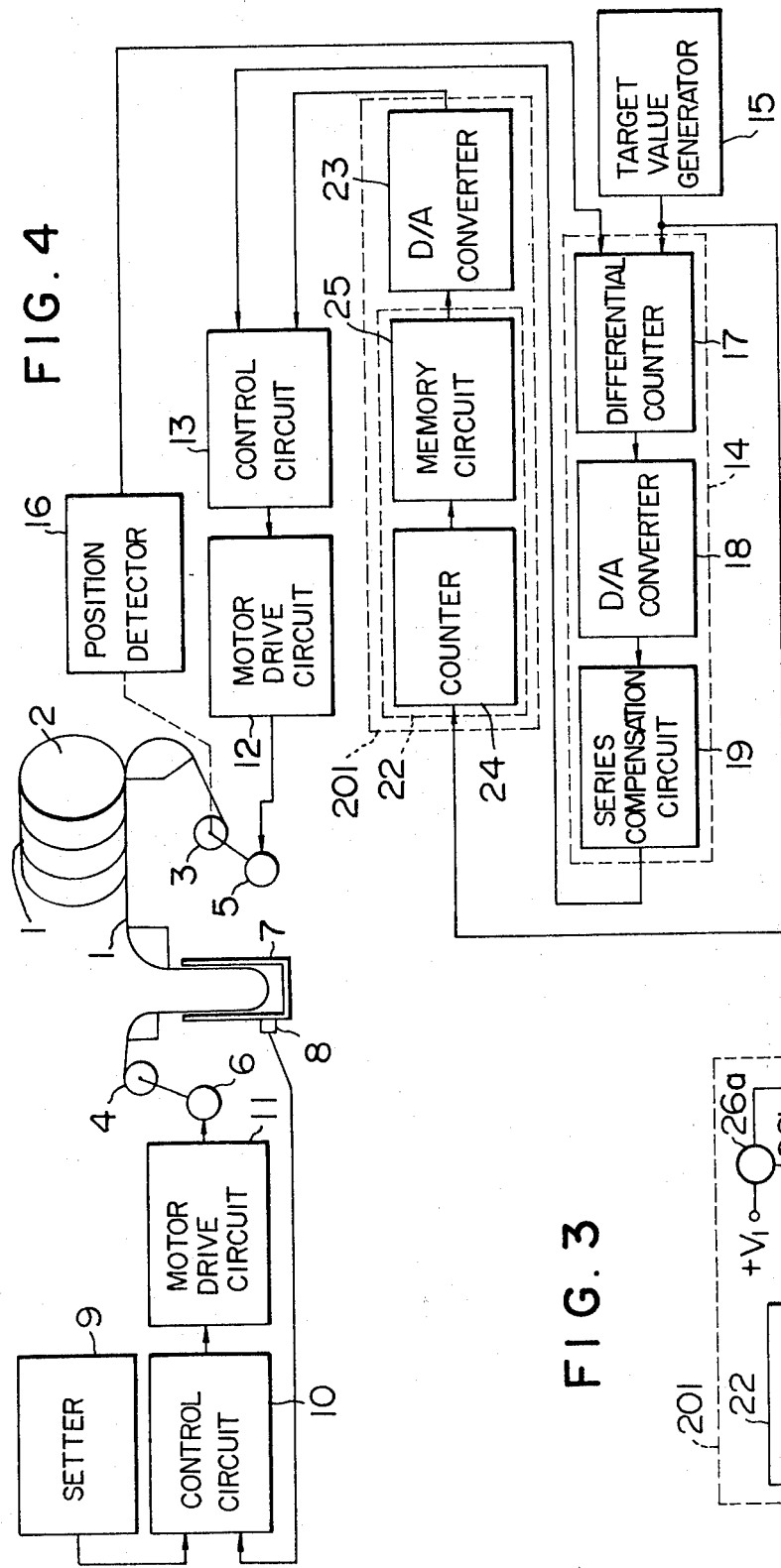
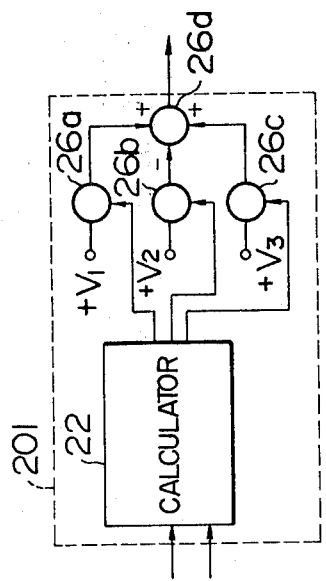
FIG. 4
FIG. 3

WEB DRIVE APPARATUS

BACKGROUND OF THE INVENTION

This invention relates to a web drive apparatus for transport of various information media in peripheral units and/or terminal units of an electronic computer.

Apparatus for driving a web such as a magnetic tape of a magnetic tape recording and reproducing apparatus have hitherto been known as disclosed in U.S. Pat. Nos. 3,781,490 and 3,912,144. In this type of apparatus, a web is wound around two web reels each driven by a separate motor, the web is transported when the web reels are driven and rotated by the motors, and information is transmitted to or from the web for recording or reproducing through an information exchange station such as magnetic head, disposed between the web reels.

Such a web drive apparatus is required to provide capability of high-speed access and highly accurate positioning. In high-speed drive of the web made of a visco-elastic material, however, a problem of transient vibrations of the web is encountered. Generation of transient vibrations of the web is more frequent in intermittent transport of the web than in constant speed transport of the web because rapid acceleration and deceleration of the web are intermittently repeated in a short time. Under the influence of transient vibrations of the web, the web may fail to be correctly positioned relative to the information exchange station even if the web is wound correctly on the take-up reel. This prevents information from being transmitted correctly to or from the intended portion of the web and thus preventing high-density recording of information on the web. Expecially the adverse affect due to transient vibrations of the web is aggravated in the case of an information exchange station using a rotary head in which information transmission through the station continues over a relatively long distance on the track across the web.

SUMMARY OF THE INVENTION

An object of the invention is to provide a web drive apparatus which can realize high density recording and high speed accessing by improving accuracy of web positioning.

Another object of the invention is to provide a web drive apparatus which can suppress transient vibrations of a web.

To accomplish the above objects, according to the invention, in a web drive apparatus in which a web is wound around a web supply reel and a web take-up reel each driven by a separate motor, and information is written into or read out of the web by means of an information exchange station disposed between the web reels, there are provided a web tension control signal generator for computing and generating a web tension control signal on the basis of a signal relating to an intermittent motion of the web, and a control circuit for correcting a position control signal to be used for controlling the drive of the motor for the web take-up reel thereby positioning the web with the web tension control signal and controlling the take-up reel motor by the corrected signal.

Construction, features and advantages of the invention will become apparent when reading the following description taken in conjunction with the accompanying drawings.

BRIEF DESCRIPTION OF THE DRAWINGS

FIG. 3 is a block diagram showing a modified embodiment of a tape tension control signal generator used in the FIG. 2 embodiment.

FIG. 4 is a schematic diagram showing still another embodiment of the web drive apparatus according to the invention.

DESCRIPTION OF THE PREFERRED EMBODIMENTS

Figure 1:
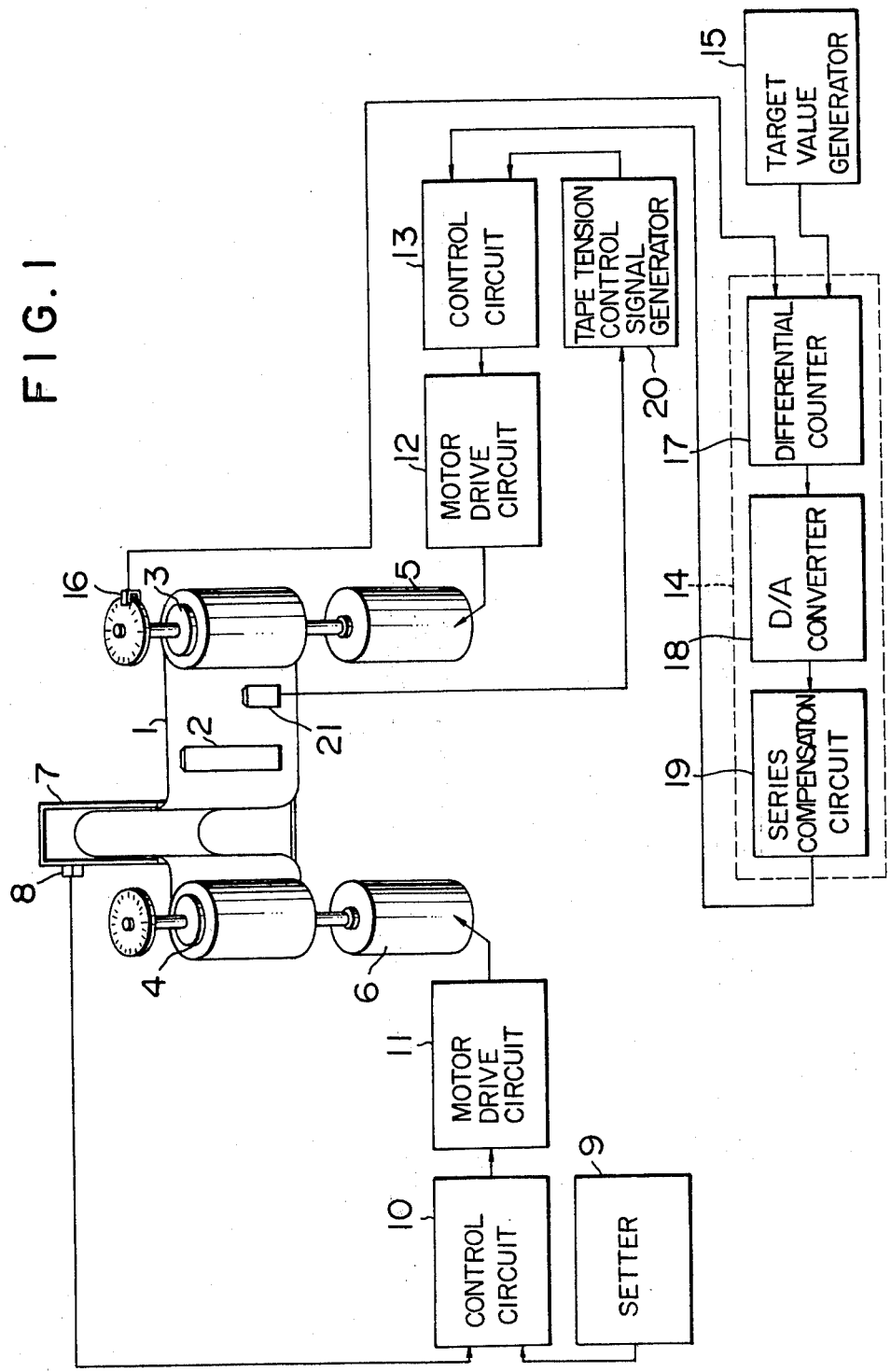
FIG. 1 is a schematic diagram showing one embodiment of a web drive apparatus according to the invention.

Referring now to FIG. 1 showing a web drive apparatus embodying the invention, information recorded on a magnetic tape 1 is read or written by means of an information exchange station 2. The magnetic tape 1 is wound around a web take-up reel 3 and a web supply reel 4 and transported over a given length along a tape running mechanism (not shown) when the web take-up reel 3 is driven. The reel 3 is driven and rotated by a motor 5 and the reel 4 is driven by a motor 6 for rotation. The magnetic tape 1 is under a predetermined tension by a tape tension generator mechanism 7 at a portion running through the information exchange station. The tape tension generator mechanism 7 is adapted to exert a buffer action on the magnetic tape 1 between the reels 3 and 4. The information exchange station 2 is disposed between the reel 3 and the tape tension generator mechanism 7.

Because of the provision of the tape tension generator mechanism 7, the reels 3 and 4 are driven and controlled separately. More particularly, a control circuit 10 compares a detection value from a detector 8 adapted to detect the volume of tape within the tape tension generator mechanism 7 with a preset value from a setter 9 to produce a deviation signal, and the deviation signal is applied via a motor drive circuit 11 to the motor 6 so as to drive and control the reel 4. The motor 5 adapted to drive and rotate the reel 3 is connected to a motor drive circuit 12, control circuit 13 for suppressing web vibrations and a control circuit 14 for position controlling. A target value generator 15 is provided to produce a clock signal of a constant frequency described hereinafter and a target value signal corresponding to a rotation angle for the reel 3 to drive the tape by a generally constant given length. The control circuit 14 comprises a differential counter 17 which receives the target value signal and pulses of a position signal derived from a position detector 16 and produces a deviation signal in the form of digital signal, a D/A converter 18 for converting the deviation signal into an analog signal and a series compensation circuit 19 for adjusting the amplitude of the analog signal supplied from the D/A converter 18 and also compensating for lead or delay of its phase so as to stabilize the control system.

The differential counter 17 is cleared and preset to a new target value upon receiving the target value signal and then begins to count down the pulses of the position signal when the reel 3 is driven towards the target position represented by the target value signal and to count up the pulses when the reel 3 is driven away from the target position. Thus, the deviation signal derived from the counter indicates the deviation in angular position of the reel 3 from the target position. The output of the control circuit 14, i.e. the output of the series compensation circuit 19, is a compensated position deviation signal corresponding to the deviation signal. The control circuit 13 compensates the position deviation signal produced from the control circuit 14 by a signal from a tape tension control signal generator 20 to cancel the components of the position deviation signal attributable to transient vibrations of the web and applies its output to the motor 5. The tape tension control signal generator 20 receives a tension signal representative of a transient vibration detected by a tape tension converter 21 and produces a tape tension control signal. The tape tension converter 21 may be any one of various types of tension converters such as a mechanical converter with a movable tension arm for pressing a roller against the magnetic tape 1, non-mechanical converter in which the magnetic tape 1 is passed above an air bearing and a pressure in the tape is sensed at the air bearing, or a load-cell converter.

Next, to detail the role of the tape tension control signal produced from the tape tension control signal generator 20, let a transfer function of an input control quantity x of the motor 5 into a displacement quantity y of the reel 3 be expressed by equation (1):

$$\alpha y = \frac{\frac{1}{K_e}}{S\left(\frac{J \cdot L}{K_T \cdot K_e} S^2 + \frac{R \cdot J}{K_T \cdot K_e} S + 1\right)} \cdot \alpha x \quad (1)$$

where: $\alpha x$ and $\alpha y$ indicate Laplace transformation of x and y, respectively, given as a function of time, R, L, $K_T$ and $K_e$ are, respectively, resistance, inductance, torque constant and constant for induced voltage measured between the motor terminals, and J is a moment of inertia of the driving system including the motor and other components, such as the reel, to be driven by the motor.

In equation (1), when the natural frequency of the driving system is small and the inductance L is small, the term of L is negligible. Then, equation (1) is written by equation (2):

$$\alpha y = \frac{\frac{1}{K_e}}{S(1 + TS)} \cdot \alpha x \quad (2)$$

where $$T = \frac{R \cdot J}{K_T \cdot K_e}.$$

As will be seen from equation (2), the control quantity x of the motor 5 is not equal to the resultant displacement quantity y of the reel 3 because a delay is caused in signal transmission. Thus, in order to cause the reel 3 to move in accordance with the displacement y which is necessary for attenuating transient vibrations of the magnetic tape 1, the tape tension control signal generator 20 compensates for the delay in signal transmission of equation (2) of the control quantity x. When an input control quantity of the motor which is compensated by the delay of signal transmission is designated by $x_a$, the compensated input control quantity $x_a$ of the motor is expressed by equation (3):

$$\alpha X_a = G_c(S) \cdot \alpha x \dots \quad (3)$$

where $G_c(S) = K_e \cdot S(1 + T \cdot S)$.

$G_c(S)$ in equation (3) represents a required transfer function of the tape tension control signal generator 20.

In this way, the tape tension control signal is generated by the tape tension control signal generator 20 in the form of the compensated motor input control quantity $x_a$.

Also, the motor input control quantity $x_a$, thus compensated for cancelling the transient vibration components is given, as a function of the motor input control quantity x, by the following equation (4):

$$x_a = K_e(\dot{x} + T\ddot{x}) \dots \quad (4)$$

Namely, the compensated motor input control quantity $x_a$ is defined by the sum of a speed component $\dot{x}$ and an acceleration component $\ddot{x}$ of the motor input control quantity x. In equation (4), T is a constant called a mechanical time constant of the control system. When the mechanical time constant T satisfies $T < < 1$ and the natural frequency of the system is small, the acceleration component is negligible and $x_a = K_e \cdot \dot{x}$ holds. Further, when the compensated motor input control quantity $x_a$ is affected by variations of the terminal resistance R, torque constant $K_T$ and moment of inertia J of the control system, it is required that the compensated motor input control quantity $x_a$ be determined in accordance with either equation (3) or (4). Here, the motor input control quantity x is corresponding to inversion in polarity of a signal representing the transient vibration component of the tape displacement to be cancelled or the output signal of the tension meter 21 which represents the tape tension varying component.

Figure 2:
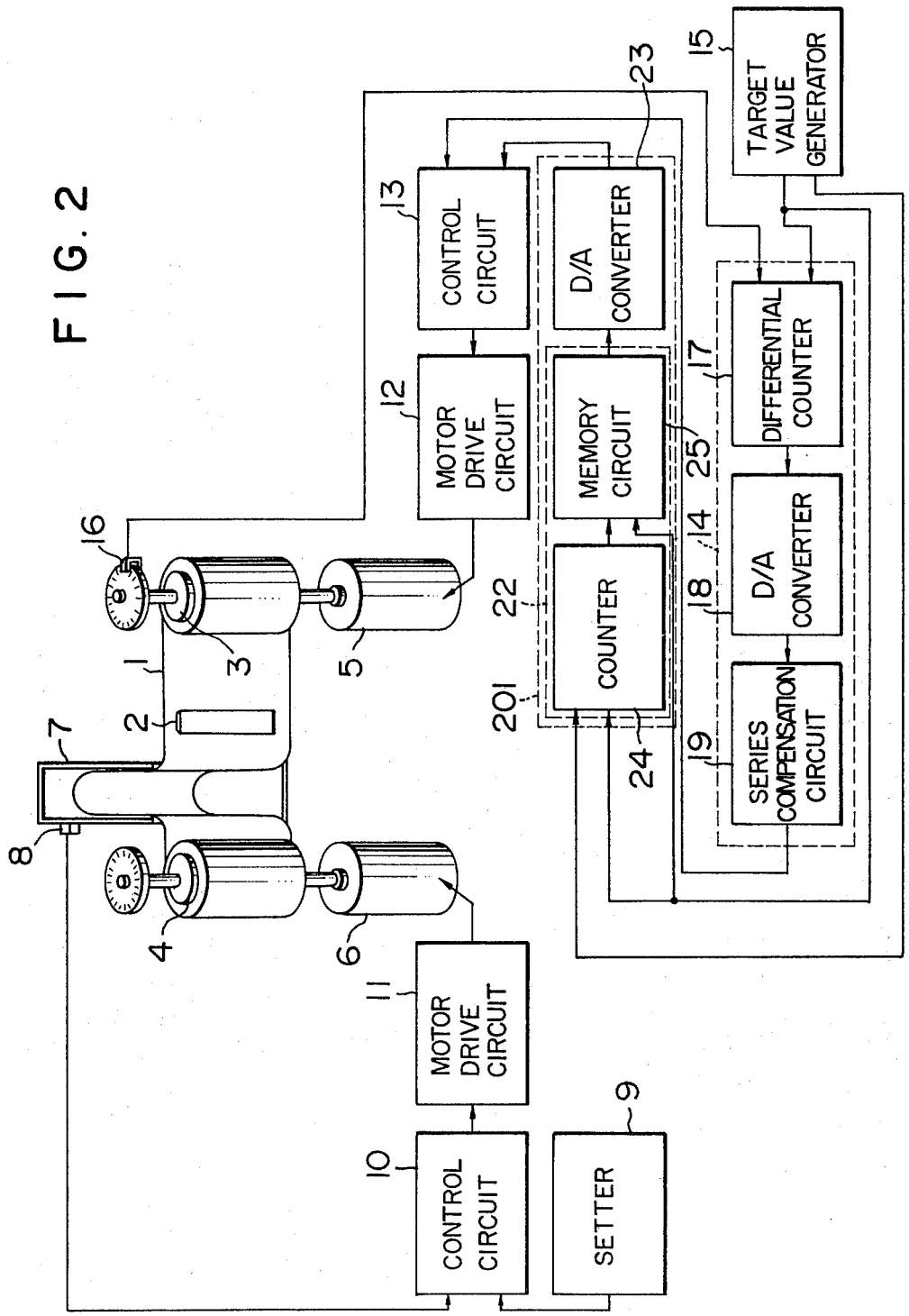
FIG. 2 is a schematic diagram showing another embodiment of the web drive apparatus according to the invention.

FIG. 2 shows another embodiment of the web drive apparatus according to the invention. In the figure, the same elements as those in FIG. 1 are designated by the same reference numerals and will not be described. A tape tension control signal generator 201 includes a calculator 22 and a D/A converter 23. The calculator 22 comprises a counter 24 and a memory circuit 25. The counter 24 receives the target value signal and the clock signal both derived from the target value generator 15. Upon receiving the target value signal, the counter 24 is reset and begins to count the pulses of the clock signal, thereby producing a time signal each time a predetermined number of pulses are counted. The memory circuit 25 may be a function generator for producing a tape tension control signal $x_a$ as a function of time represented by the time signal, according to the equation (4) or a memory preliminarily storing various values of the tape tension control signal $x_a$ which are calculated based on the output of the tape tension converter 21 or a tape vibration meter as a function of time. This memory circuit 25 may be constituted by a ROM, a logical element comprised of a flip-flop and a latch circuit, or an operation circuit such as a microcomputer. The reason why the values of the tape tension control signal can be preliminarily stored in the memory circuit 25 is such that first, the natural frequency component of the transient vibration characteristics of magnetic tape 1 is determined by the material and the running path length of the magnetic tape 1 and second, under the same driving condition, substantially the same constant vibration characteristics always result. However, the tape tension control signal sometimes may differ slightly depending on the load for the motor 5. In order to compensate for such slight change, the memory circuit may be arranged to preliminarily store plural sets of the values of the tape tension control signal $x_a$ dependent on predetermined different values of the output of the tape tension converter 21 so that the stored values are selectively read out depending on the measured value of the output of the tape tension converter.

With the above arrangement, the counter 24 counts the clock signal and applies the time signals to the memory circuit 25. Consequently, the memory circuit 25 reads the tape tension control signal stored beforehand each time the time signal is received, and the read-out signal is applied to the control circuit 13 via the D/A converter 23. The control circuit 13 then applies to the motor 5 a control signal in the form of an adverse vibratory input signal which cancels out the transient vibrations of the magnetic tape. In this way, the transient vibrations of the magnetic tape 1 can be suppressed.

It should be understood that the D/A converter 23 used for D/A signal conversion in the embodiment of FIG. 2 may be replaced by a switching circuit utilizing switches 26a to 26d as shown in FIG. 3. Further, a D/A converter included in the control circuit 14 may substitute for the separate D/A converter 23. Furthermore, it is desirable that the tape tension converter 21 to be located near the information exchange station 2, to ensure that the tension of the magnetic tape 1 at a portion which passes the information exchange station 2 can be controlled optimumly. When the location of the tape tension converter 21 is restricted, it is effective that the tape tension converter 21 is added with a function to compensate the phase of the tape tension control signal. Furthermore, the tape tension control signal generator 20 may be arranged to respond to the signal of the tape tension converter 21 so as to generate the tape tension control signal.

FIG. 4 illustrates still another embodiment of the invention. In the figure, like reference numerals designate like elements in FIGS. 1 to 3. In this embodiment, an information exchange station 2 takes the form of a rotary magnetic head, and the apparatus of the invention as shown in FIG. 2 is applied to a magnetic memory unit having a magnetic tape 1 wound on the rotary magnetic head. In the application of the teaching of the invention to the magnetic memory unit with the rotary magnetic head, the transient vibrations of the magnetic tape can be suppressed as in the foregoing embodiment of FIG. 2. It is also possible to apply the apparatus of the invention as shown in FIG. 1 to the embodiment of FIG. 4. In this application, the tape tension converter may be located at the magnetic tape inlet or outlet of the information exchange station 2 incorporating the rotary magnetic head. It should also be appreciated that teachings of the invention may be applied to a magnetic recording and reproducing apparatus without a tape tension generator mechanism.

As described above, according to the invention, the adverse vibratory signal inverse to the transient vibrations of the web is applied to the control circuit, thereby suppressing the web transient vibrations. As a result, the accuracy of web positioning can be improved to insure high density recording and high speed access to an intended portion of the web.

We claim:

1. In a web drive apparatus wherein a web is wound around a web supply reel and a web take-up reel each driven and rotated by a separate motor, and information is written into or read out of the web by means of an information exchange station disposed between the reels, the improvement which comprises:
    web tension control signal generator means for generating a web tension control signal on the basis of variations in the tension of the web between said supply and take-up reels when said web is subjected to intermittent movement;
    position control means for producing a position control signal to be used for positioning said take-up reel;
    control means for correcting said position control signal in accordance with said web tension control signal so as to cancel transient vibrations of the web, and including means for applying the corrected position control signal to said web take-up reel motor.

2. A web drive apparatus according to claim 1 wherein said web tension control signal generator means includes tape tension detector means disposed between said supply and take-up reels for detecting variations in the tension of the web indicative of vibrations in the web.

3. A web drive apparatus according to claim 2 wherein said tape tension detector means is disposed between the web take-up reel and the information exchange station.

4. A web drive apparatus according to claim 1 wherein said web tension control signal generator means includes means for storing predetermined different values of said web tension control signal and for selectively reading out said values according to the position of said take-up reel.

5. A web drive apparatus according to claim 4 wherein said position control means includes target value generator means for producing a signal indicative of a desired position of said take-up reel and a clock signal of a constant frequency, and wherein said web tension control signal generator means includes counter means for counting said clock signal produced by said target value generator means thereby producing a time signal and means responsive to said time signal for selectively reading out said values stored in said storing means.

6. A web drive apparatus according to claim 5 wherein said storing means stores values of said web tension control signal which are predetermined according to the material of said web and the driving load of the motor driving said take-up reel.

7. A web drive apparatus according to claim 1 wherein said web tension control signal generator means includes means for storing predetermined different values of said web tension control signal and for selectively reading out said values according to the tension of the web.

8. A web drive apparatus according to claim 7 wherein said values of said web tension control signal are predetermined according to the material of said web and the driving load of the motor driving said take-up reel.

9. A web drive apparatus according to claim 1 wherein said position control means includes target value generator means for producing a target value signal indicative of a desired position of said take-up reel and a clock signal of a constant frequency, position detector means for producing a pulse signal indicative of the position of said take-up reel, differential counter means responsive to the outputs of said target value generator means and said position detector means for producing a digital deviation signal, and converter means for converting the output of said differential counter means to said position control signal applied to said control means.

10. A web drive apparatus according to claim 9, wherein said differential counter means comprises a differential counter which is connected to be reset by said target value signal and to count said clock signals of constant frequency, the output of said position detector means being applied to said differential counter to control the direction of counting thereof.

* * * * *